(12) United States Patent
Wolff et al.

(10) Patent No.: US 9,140,393 B2
(45) Date of Patent: Sep. 22, 2015

(54) FUEL LINE BREAKAWAY CONNECTOR SECURED BY PLURALITY OF INDIVIDUALLY SPACED MAGNETS

(71) Applicants: Brian P. Wolff, Raytown, MO (US); Arthur C. Fink, Jr., Lonedell, MO (US)

(72) Inventors: Brian P. Wolff, Raytown, MO (US); Arthur C. Fink, Jr., Lonedell, MO (US)

(73) Assignee: Husky Corporation, Pacific, MO (US)

( * ) Notice: Subject to any disclaimer, the term of this patent is extended or adjusted under 35 U.S.C. 154(b) by 170 days.

(21) Appl. No.: 13/986,110

(22) Filed: Apr. 2, 2013

(65) Prior Publication Data

US 2013/0276923 A1 Oct. 24, 2013

Related U.S. Application Data

(60) Provisional application No. 61/687,237, filed on Apr. 20, 2012.

(51) Int. Cl.
*F16L 37/00* (2006.01)
*F16L 37/32* (2006.01)

(52) U.S. Cl.
CPC ............... *F16L 37/004* (2013.01); *F16L 37/32* (2013.01); *Y10T 137/87941* (2015.04)

(58) Field of Classification Search
CPC ..... F16L 2201/20; F16L 37/004; F16L 37/32; F16L 55/1007; F16L 55/1015; Y10T 137/87933; Y10T 137/87941; Y10T 137/87949; Y10T 137/87957; Y10T 137/87965
USPC .................. 137/68.14, 68.15, 614.01–614.05; 251/149.7; 285/1, 2, 9.1
See application file for complete search history.

(56) References Cited

U.S. PATENT DOCUMENTS

| | | | |
|---|---|---|---|
| 2,793,057 A | 5/1957 | McGugin | |
| 2,912,263 A | 11/1959 | Christy | |
| 3,104,088 A | 9/1963 | Cator | |
| 3,181,895 A | 5/1965 | Cator | |
| 3,317,220 A | 5/1967 | Bruning | |
| 3,586,048 A | 6/1971 | Arnold | |
| 3,715,099 A | 2/1973 | Shendure | |
| 4,049,295 A | 9/1977 | Piers | |
| 4,060,110 A | 11/1977 | Bower | |
| 4,262,712 A | 4/1981 | Young | |
| 4,691,941 A | 9/1987 | Rabushka et al. | |
| 4,763,683 A | 8/1988 | Carmack | |
| 4,827,977 A | 5/1989 | Fink, Jr. | |
| 4,896,688 A * | 1/1990 | Richards et al. | 137/68.15 |
| 4,905,733 A | 3/1990 | Carow | |
| 5,096,230 A | 3/1992 | Pausch et al. | |
| 5,115,836 A * | 5/1992 | Carow et al. | 137/614.04 |
| 5,165,439 A | 11/1992 | Krynicki | |
| 5,209,262 A * | 5/1993 | Carow et al. | 137/614.04 |
| 5,263,511 A | 11/1993 | Ohasi et al. | |
| 5,365,973 A * | 11/1994 | Fink et al. | 137/614.04 |
| 5,419,354 A | 5/1995 | Krynicki | |

(Continued)

*Primary Examiner* — Craig Schneider
*Assistant Examiner* — Craig J Price
(74) *Attorney, Agent, or Firm* — Paul M. Denk

(57) ABSTRACT

A breakaway coupling including a pair of sleeves, one sleeve fitting within the other, each sleeve having a hose connector secured therethrough, the first sleeve holding a metal annulus, the second sleeve securing a continuous magnetic annulus, so when the sleeves are brought together the magnetic annulus secures onto the metal annulus to hold the coupler in its connected position. The continuous metallic annulus includes a metal base, a spacer that holds a series of standard round magnets equally spaced around the approximate perimeter of the spacer and its base.

18 Claims, 8 Drawing Sheets

(56) References Cited

U.S. PATENT DOCUMENTS

| | | | |
|---|---|---|---|
| 5,433,247 A * | 7/1995 | Guertin | 137/614.04 |
| 5,529,085 A * | 6/1996 | Richards et al. | 137/68.15 |
| 5,570,719 A * | 11/1996 | Richards et al. | 137/614.04 |
| 5,615,706 A * | 4/1997 | Guertin | 137/614.04 |
| 6,182,695 B1 | 2/2001 | Coates, III et al. | |
| 6,192,934 B1 | 2/2001 | Coates, III et al. | |
| 6,283,151 B1 | 9/2001 | Countryman et al. | |
| 6,334,474 B1 | 1/2002 | Rababy et al. | |
| 6,899,131 B1 | 5/2005 | Carmack et al. | |
| 7,252,112 B1 | 8/2007 | Imler et al. | |
| 7,487,796 B2 | 2/2009 | Imler et al. | |
| 7,575,023 B2 | 8/2009 | Fraser | |
| 7,753,079 B2 | 7/2010 | Nelson | |
| 7,793,987 B1 | 9/2010 | Bush et al. | |
| 7,980,173 B2 * | 7/2011 | Carmack et al. | 285/1 |
| 8,210,572 B2 * | 7/2012 | Davis | 285/9.1 |
| 8,578,957 B2 * | 11/2013 | Wolff | 137/68.15 |

* cited by examiner

US 9,140,393 B2

FUEL LINE BREAKAWAY CONNECTOR SECURED BY PLURALITY OF INDIVIDUALLY SPACED MAGNETS

CROSS REFERENCE TO RELATED APPLICATION

This non-provisional patent application claims priority to the provisional patent application having Ser. No. 61/687,237, filed on Apr. 20, 2012.

FIELD OF THE INVENTION

The concept of this invention is the fabrication of a breakaway connector, for use within a fuel line, and one that is assembled and secured together through the use of a plurality of strategically placed magnets, that maintains the coupler in its assembled and useful position when installed in a fuel line hose, but that when the hose is subjected to excessive force, such as when a vehicle inadvertently drives off with the fuel dispensing nozzle still located within the fill pipe of the automobile, the breakaway coupler separates to prevent fuel spillage and further damage to the dispensing system, or the vehicle.

BACKGROUND OF THE INVENTION

The dispensing of fuel at a service station, of a more recent vintage, substantially includes the dispensing and sale of gasoline through the self-service method of refueling one's vehicle. This has now been occurring for the last 30 years. Previously, when gasoline was dispensed, it was done by the service station attendant, who would locate the nozzle within the vehicle tank, dispense the gas, wipe the windows, and then replace the nozzle back into the dispenser, once refueling has been accomplished. Rarely was there ever a problem of causing damage to the dispensing equipment, because the attendant made sure everything was in order, and that the nozzle was reinstalled at the dispenser, with little or no chance of an inadvertent drive off, by the vehicle operator. But, since self-service has come into existence, it is a more frequent occurrence that once a driver has applied self-service to fill up his fuel tank, and either make payment at the pump, or to go inside the facility to pay by cash or credit card, it does more frequently occur that the location of the fuel dispensing nozzle, in the vehicle fill pipe, is forgotten, and the driver will sometimes drive off, pulling the nozzle and the fuel hose with him/her, resulting in substantial damage to the dispensing system and fuel spillage.

As a result of the foregoing, it has become a necessity to include a breakaway coupling within the fuel dispensing hose; usually they can be found high up on the hose near the dispenser, and readied for application when necessary. Thus, should a driver forget, and drive off with the nozzle still in the vehicle, while the hose may be stretched, once it reaches a specified force, such as approximately 100 pounds, the breakaway coupling will separate, its internal check valves will be released, into closure, and thereby preventing any further flow of fuel, and even stop any backflow of fuel from the nozzle through the separated hose, for spilling on the ground. By this time, the driver will be alerted to the fact that something is wrong, that the dispensing nozzle may have been left within the fill pipe, and therefore, immediately stops, in an attempt to remedy the problem. At this stage, the station attendant can look over the equipment, and if it does not appear that any damage has been sustained, he can simply reinstall the breakaway coupler, and place the dispensing system back into immediate service, as required.

The assignee of the current invention and patent application has received many United States patents upon various types of breakaway hose coupling devices.

For example, U.S. Pat. No. 4,827,977 shows one such Breakaway Hose Coupling, which is generally held in position and coupled by means of detents that secure the coupling in its usable position. But, when an excessive force is encountered upon the fuel line hose, the detents separate from the coupling, and allow the pair of fittings to separate, to prevent further damage to the nozzle, or to the hose and dispenser with which it connects.

U.S. Pat. No. 5,365,973 shows another Break-Away Concentric Hose Coupling. It likewise is held into position through the use of fittings, and which coupling can be reconnected, after it has been inadvertently separated. The coupling also includes one or more check valves, which prevent the further flow of fuel, when decoupling occurs.

U.S. Pat. No. 6,192,934 shows another Break-Away Concentric Hose Coupling. This coupling is held together through the use of a series of springs, that maintain the coupling in its usable condition, but which separates when excessive force has been encountered.

Another U.S. Pat. No. 6,182,695 shows a further Breakaway Coupling and Coupler Therefor. This one is held in its usable position through the use of a series of detent ball.

There is another U.S. Pat. No. 7,575,023, that shows a Disposable Breakaway Nozzle Connector, and in this instance, is a separable connector, that incorporates a pair of the check valves to prevent fluid discharge when an untimely decoupling of the connector occurs. These are all for application within a fuel line hose, connected to a fuel dispenser.

The applicant has other applications pending, as can be noted in the cross reference for this particular application.

Various other breakaway hose couplings can be seen in the United States patent to Carmack, et al, U.S. Pat. No. 6,899,131, upon a Breakaway Hose Coupling with Manual Rotational Separation, which attains its separation through a manual rotation of its two male and female tubular valve bodies.

Other breakaway couplings can be seen in the patent to Carmack, U.S. Pat. No. 4,763,683, which is a Breakaway Coupling for a Coaxial Fuel Supply Hose.

Of more recent vintage, is the use of magnets for holding the breakaway coupling together, and which coupling when subjected to a significant force, such as that 200 pounds of pressure as promulgated by various State Regulations, such as the California Air Resources Board, subjects that type of force to a breakaway coupling, the magnets separate the coupling and allow the standard internal check valves to close. This can be seen in the Carmack U.S. Pat. No. 7,252,112, which provides a Breakaway Hose Coupling with a Magnetic Connection. In this particular breakaway, the magnets used are arcuate permanent magnets, made of ferrous metal, and as can be seen in his FIG. 2, these magnets are held in position by means of locating within an annular groove, within its annular support member, to function as the means for engaging a strike member, to hold the connection, during routine usage. This device also defines the use of cover members, one that surrounds the other, in a telescopic relationship.

Another breakaway hose coupling utilizing magnets is also shown in the United States patent to Imler, et al, U.S. Pat. No. 7,487,796, upon a Breakaway Hose Coupling with a Magnetic Connection. This particular unit also uses a plurality of circumferentially spaced arcuate permanent magnets, which are recessed within an annular groove of its supporting member, to hold the coupling in place.

The use of telescoping sleeves in releasable fluid couplings can be seen in the early U.S. Pat. No. 3,317,220, in addition to U.S. Pat. No. 3,715,099. Furthermore, U.S. Pat. No. 4,691, 941 shows the use of sleeves within fluid couplings. Also, U.S. Pat. No. 4,905,733, in addition to U.S. Pat. No. 6,283, 151, shows the use of sleeves within breakaway couplings.

With regard to the use of magnets for forming couplings, back as early as the 1960s, U.S. Pat. No. 3,181,895, shows annular magnets used in a quick connect magnetic coupling for a high pressure line. It can be seen that these are annular magnets.

U.S. Pat. No. 3,586,048, shows a magnetic coupling, of a quick-disconnect type. This patent describes the use of permanent magnets that encircle the body member of the coupling.

U.S. Pat. No. 4,060,110, discloses a vapor recovery nozzle that utilizes a permanent magnet to control its operations.

U.S. Pat. No. 4,262,712, shows a magnetically latchable liquid dispensing nozzle. The shown magnet is radially disposed about the nozzle spout.

U.S. Pat. No. 4,049,295, shows a magnetic coupling for metal tubes, wherein permanent magnets are used to provide for connection of the tubes that carry fluids, especially gases, during usage.

U.S. Pat. No. 6,334,474, shows the use of magnetic units for holding various components of a breakaway unit that provides a signal when a vehicle has inadvertently driven away with the nozzle in its fuel tank.

U.S. Pat. No. 5,096,230, shows the use of circular magnets to form a quick release adaptor for connecting an exhaust removal hose to a vehicle tailpipe using these magnets. These are round magnets, as shown.

U.S. Pat. No. 5,165,439, described as a frangible connector, shows the use of permanent magnets within a breakaway connection for a fuel line. These permanent magnets are provided in a circular array around the flow line. See its FIG. 59.

U.S. Pat. No. 5,263,511, shows the use of magnets for holding vapors within a vehicle fuel tank.

The patent to Krynicki, U.S. Pat. No. 5,419,354, discloses the use of magnets for holding a separable connector within a fluid passage line.

U.S. Pat. No. 7,753,079, discloses magnetic coupling for spray heads.

U.S. Pat. No. 3,104,088, discloses a quick disconnect coupling, utilizing magnets.

U.S. Pat. No. 2,912,263 shows an internal sleeve type pipe coupling with magnetically secured external sleeve means.

U.S. Pat. No. 2,793,057, discloses a magnetic hose coupling.

The patent to Busch, et al, U.S. Pat. No. 7,793,987, shows the use of circular magnets for providing a magnetic coupling assembly for coupling portions of a gas delivery system together. It shows a multiple array of round magnets located around the periphery of the gas flow delivery system.

These are examples of a full array of prior art materials that disclose the use of permanent magnets, even round magnets, for use for holding flow lines together, and even fuel flow lines, and which magnets have even been used in breakaway coupling mechanisms, to hold its components together, during their application and usage. Hence, the prior art is replete with the use of permanent magnets for providing couplings within pipes and passageway structures, as can be noted.

In fact, as previously alluded to, the California Air Resources Board (CARB) dictates that a breakaway connector must be able to resist pressures up to 100 pounds, but will separate at that magnitude of force, when a force of greater than 100 pounds of pressure is exerted upon the fuel flow line for the gasoline dispenser system.

SUMMARY OF THE INVENTION

The concept of this invention is to provide a fuel line breakaway connector that is secured by a plurality of spaced magnets, which are conveniently held apart by means of a spacer that provides for uniformity of magnetic force to keep the coupler when applied in a fuel line connected, but that when an excessive force, of 100 pounds or more, is exerted upon the fuel line, the coupler will breakaway, to prevent any excessive damage to the fuel dispenser, or the vehicle in which the nozzle locates.

The particular breakaway coupling of this invention is of relatively thin line construction, providing a first sleeve having a cover at one end, with a cover having an aperture provided therethrough, and through which a part of the fuel line hose coupling or connector locates. Provided within the sleeve is a metal annulus, one that is subject to magnetic attraction, and the annulus fits around a part of the connector that partially inserts into the sleeve, during its installation. The metal annulus is held in place by means of a fastener, such as a resilient E-clip, that tightly locates within a groove formed around the inner part of the connector, in order to hold the metal annulus in place, thereby providing for at least one half of the breakaway connector, when applied to the fuel dispensing hose. That particular part of the hose connector includes internally a valve seat, and a check valve that is spring biased into closure, upon its valve seat, and the check valve presents a socket, internal of the sleeve, that cooperates with a corresponding check valve of the other part of the connector, to maintain the breakaway connector in an opened condition, to allow for free flow of gasoline or other fuel therethrough, when fully installed.

A second sleeve is provided, and the second sleeve incorporates a magnetic continuous annulus that holds the various magnets, that affects the breakaway coupling into connection, during its routine usage. The magnetic continuous annulus includes just that, a circular annulus that has a metal annular base, with a series of round or other shaped magnets strategically arranged upon the base, and further includes a spacer, presenting a series of outwardly diagonally directed circular openings, into which the magnets insert, so that the spacer provides a means for arranging the magnets equally spaced, around the circumference of the base, when it is assembled for application. Upon the spacer, and the arranged magnets, is a cover ring, of thin line construction, which may be anywhere from 0.015 in. to 0.050 in., or more, in thickness, and it is held on top of the spacer, and the magnets, through magnetic attraction. The cover ring provides for convenient dissemination of the magnetic field, which attracts the metal annulus of the first sleeve, to hold the entire unit in its coupled position, as it is assembled and readied for usage. Once again, a hose connector for the opposite end of the fuel line hose, partially inserts within the cover of the second sleeve, extends through the magnetic assembly, and is secured in position within the second sleeve by means of another fastener, such as a resilient E-clip, to hold the second sleeve to the fuel line, when readied for application. The fuel line hose connector locates partially within the second sleeve and also includes a check valve and a valve seat, the valve being spring biased into closure upon its seat, but the valve includes a extension pin, that sets into the socket of the first check valve, to bias both of the check valves into an unseated condition, within the breakaway coupling, when it has been joined together, and magnetically held into closure, when readied for application in the fuel line hose, as assembled for usage.

The portions of the hose connectors that remain outside are externally of their respective first and second sleeves and extend for some distance, and are multisided in configuration, so that a wrench or other tool can be applied thereon, to aid in their installation onto the ends of their contiguous fuel line hose, when assembled. Actually, these parts of the hose connectors are preferably hexagonal of shape, to allow for installation of a wrench, during application.

In addition, each of the integral cover portions of the respective first and second sleeves, have a counterbore, that are of a size slightly greater than the ends of the shaped hose connector that locates therein, so as to provide for a seating and snug fit of all of these components together, when fastened into their usable configuration. In addition, each hose connector has a channel provided centrally therethrough, and the portion of the channel within each hose connector that remains exteriorly of the cover part of each sleeve is internally threaded, so as to conveniently allow for the hose connectors to be threadily engaged onto a corresponding fitting provided at the end of each of the adjacent fuel line hose, and to which the breakaway coupling is installed.

The concept of this invention is to provide a conveniently spaced and arranged magnetic continuous annulus, that fits within one of the sleeves, and which is assembled using standard round magnets, that are properly and equally spaced in their positioning upon the annulus base, providing for self installation of these components together, because of the strong magnetic attraction of the standard magnets disposed thereon. Then, a thin plate or cover ring annulus is arranged over the magnets and its spacer, and it is this cover ring that provides for a disseminated magnetic force and flux that attractively holds the metal annulus of the other sleeve, when the two are brought together into connection, when the coupler is prepared for installation and usage.

This describes and provides a summary of the various components, and their functionality, and the means for providing for their more efficient usage and application within a breakaway coupling, used within a fuel line dispensing hose, so as to obviate or at least lessen the chances of damage to either the dispenser, of a vehicle, should one inadvertently drive off after self-servicing of the automobile during fueling.

It is, therefore, the principal object of this invention to provide a breakaway coupling of minimum components, that are easily assembled, provide a uniformity of magnetic force to hold the coupling into its connective position, but which can be broken free and separated, when the fuel dispensing hose is subjected to significant force.

An object of this invention is to provide a breakaway coupling that can separate when a force of approximately 100-300 pounds of pressure is exerted upon the fuel line and its breakaway coupling.

Still another object of this invention is to provide a breakaway coupling that only includes about five preassembled components, which when installed together, furnish a magnetic coupling that provides uniformity of magnetic force, to hold it in its installed position, but yet will break apart when excessive force is exerted thereon.

Still another object of this invention is to provide a breakaway coupling that can easily be reopened, when it needs to be serviced, through the use of a couple of tools, such as screwdrivers, that bias against the first and second sleeves of the coupler to provide for their manual separation.

Another object of this invention is to provide means for uniformly mounting various standard magnets, that do not have to be custom manufactured, to provide significant attraction force for holding a breakaway coupling in its assembled condition, and which will not separate unless subjected to substantial linear force.

Still another object of this invention is to provide a magnetic means, including a base, round or other shaped magnets, conveniently held by a spacer into very discreet and precise dimensions apart, and having a cover plate that disseminates the magnetic forces for attracting a metal annulus of the coupler's other sleeve, when it is assembled for installation and usage within a fuel dispensing hose.

These and other objects may become more apparent to those skilled in the art upon review of the summary of the invention as provided herein, and upon undertaking a study of the description of its preferred embodiments, in view of the drawings.

DESCRIPTION OF THE PREFERRED EMBODIMENT

Figure 1:
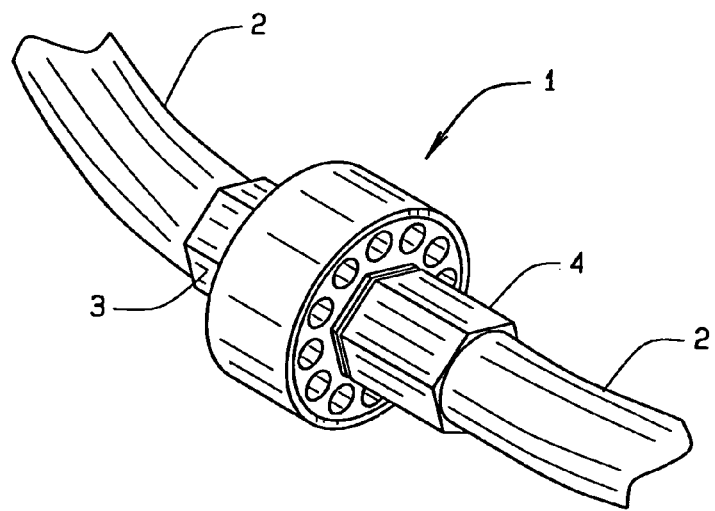
FIG. 1 provides an isometric view of the breakaway connector of this invention.
Figure 2:
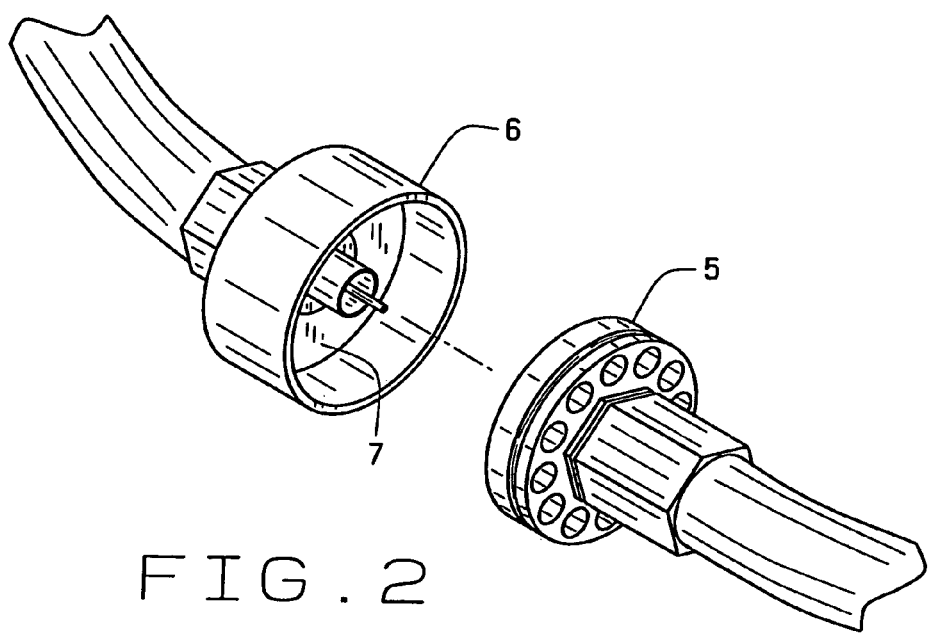
FIG. 2 shows the breakaway connector of FIG. 1, but after its first and second sleeves have been disconnected.

In referring to the drawings, and in particular FIG. 1, the fuel line breakaway connector secured by a plurality of magnets, of this invention is readily disclosed, at reference character 1. The device connects within the fuel line hose 2, which has had its hose connectors 3 and 4 secured to the ends of the hose, and then secured within the breakaway coupling 1, as can be noted. FIG. 2 shows the coupler in separation, and it can be seen that each coupler includes a sleeve like member 6 and a shallow magnetic covering sleeve 5, wherein the sleeve 5, with its connecting mechanism, fits within the second sleeve 6, and secures with its magnetic connector, as noted at 7.

Figure 3:
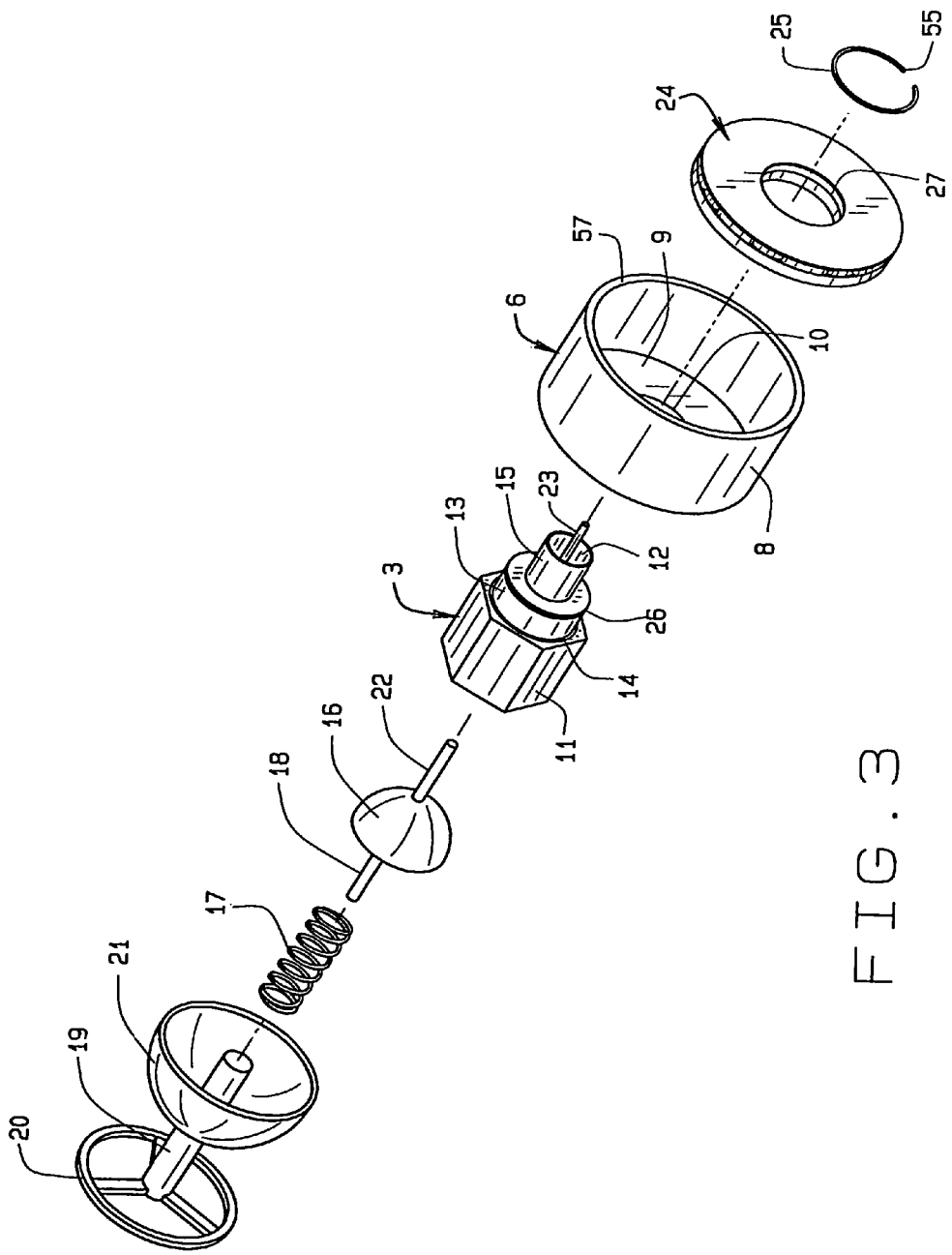
FIG. 3 provides an isometric exploded view of the second sleeve of this invention, with its continuous magnetic annulus shown apart from its sleeve location.
Figure 4:
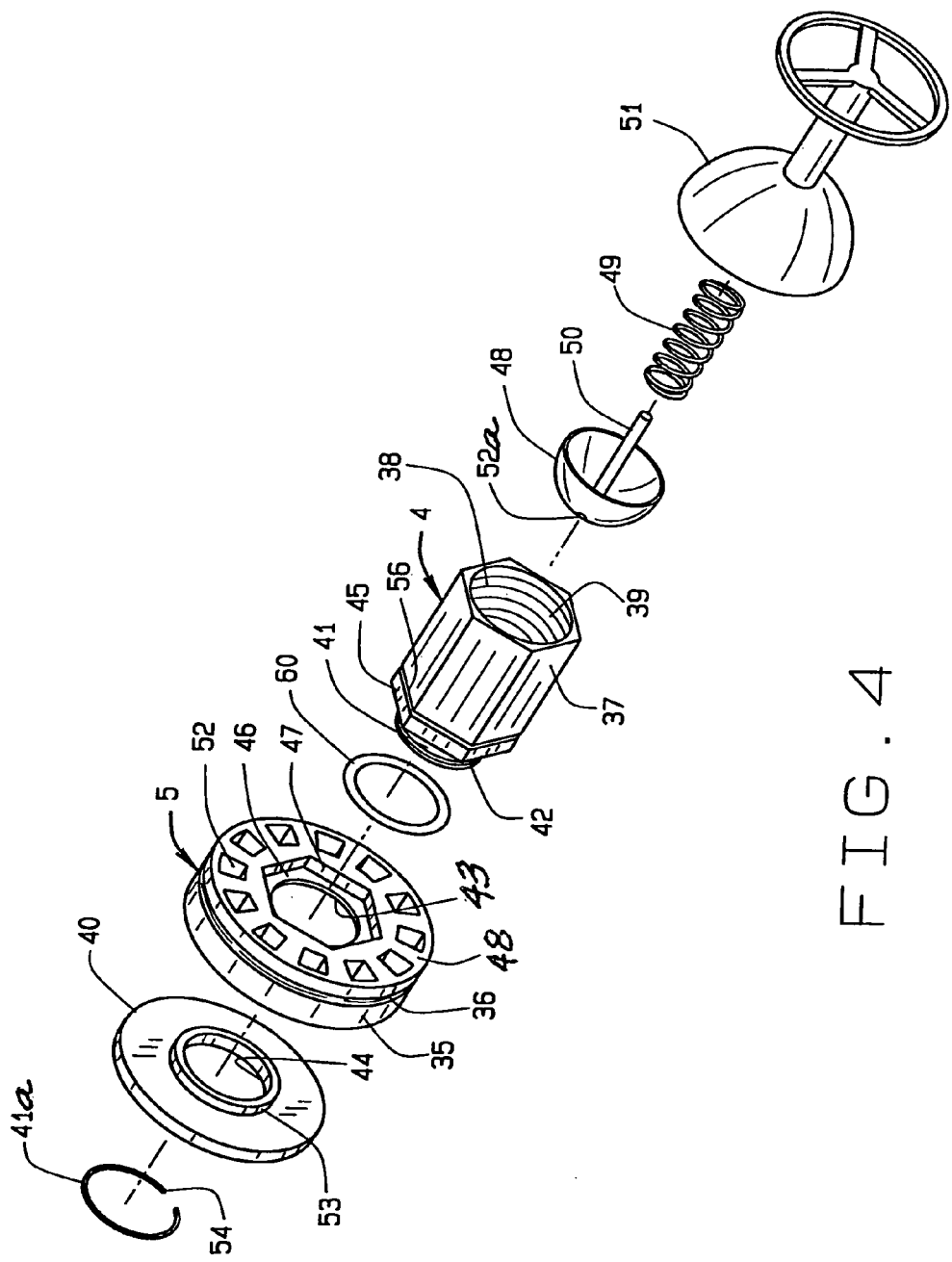
FIG. 4 provides an isometric exploded view of the first sleeve of this invention, that holds the metal annulus for the breakaway connector.

The more specific components of the various first and second sleeves 5 and 6 can be more readily seen in FIGS. 3 and 4.

As noted in FIG. 3, the second sleeve 6 includes an extending sleeve like portion 8, which includes an integral cover 9 that has a central aperture 10 provided therethrough. The sleeve is designed for accommodating the insertion, partially, of the hose connector 3. The hose connector 3 includes that portion that remains exteriorly of the second sleeve 6, and it is multisided, as can be noted at 11. The purpose of this is to allow a wrench to be applied thereon, when the hose connector is being securely fastened to an end of the fuel dispensing hose, and to aid in the insertion of the hose connector partially within the sleeve 6, as can be noted in FIG. 2. The second sleeve 3 has a fluid passageway, as at 12, which extend entirely through it, and it also has an integral shoulder 13 extending from its front end, and the shoulder fits snuggly within the aperture 10, of the sleeve 3. In addition, an o-ring 14 is seated upon the surface of the sleeve portion 11, and provides a dust seal against the outer surface of the sleeve cover 9. The connector 3 includes a further integral cylindrical extension 15, extending from the front of the shoulder 13, and at its inner end forms a seat for accommodating the seating of the valve 16 thereagainst, when the coupling 1 has been separated, with the valve 16 seating against its valve seat, under the bias of its spring 17, that seats upon its stem 18. A spider 19 is located internally within the flow line of the second valve 3, with its ring like member 20 being rigidly secured therein, and having the valve stem 18, and its spring 17, locating within the surface 21 of the valve mount, to provide for its fixation within the second sleeve 3, during its installation. The front of the valve 16 has an extension 22, which projects out of the integral cylinder 15, as to be noted by the hidden line 23.

Locating within the second sleeve 6 is the continuous magnetic annulus 24 and this annulus secures upon the integral mount 13, and is held securely against the interior of the cover 9, by means of the spring E-clip 25 that locates within a formed groove 26 provided upon the frontal edge of the mount 13, as can be noted. The mount 13 extends through the aperture 27 of the magnetic annulus, as can be noted.

Figure 5:
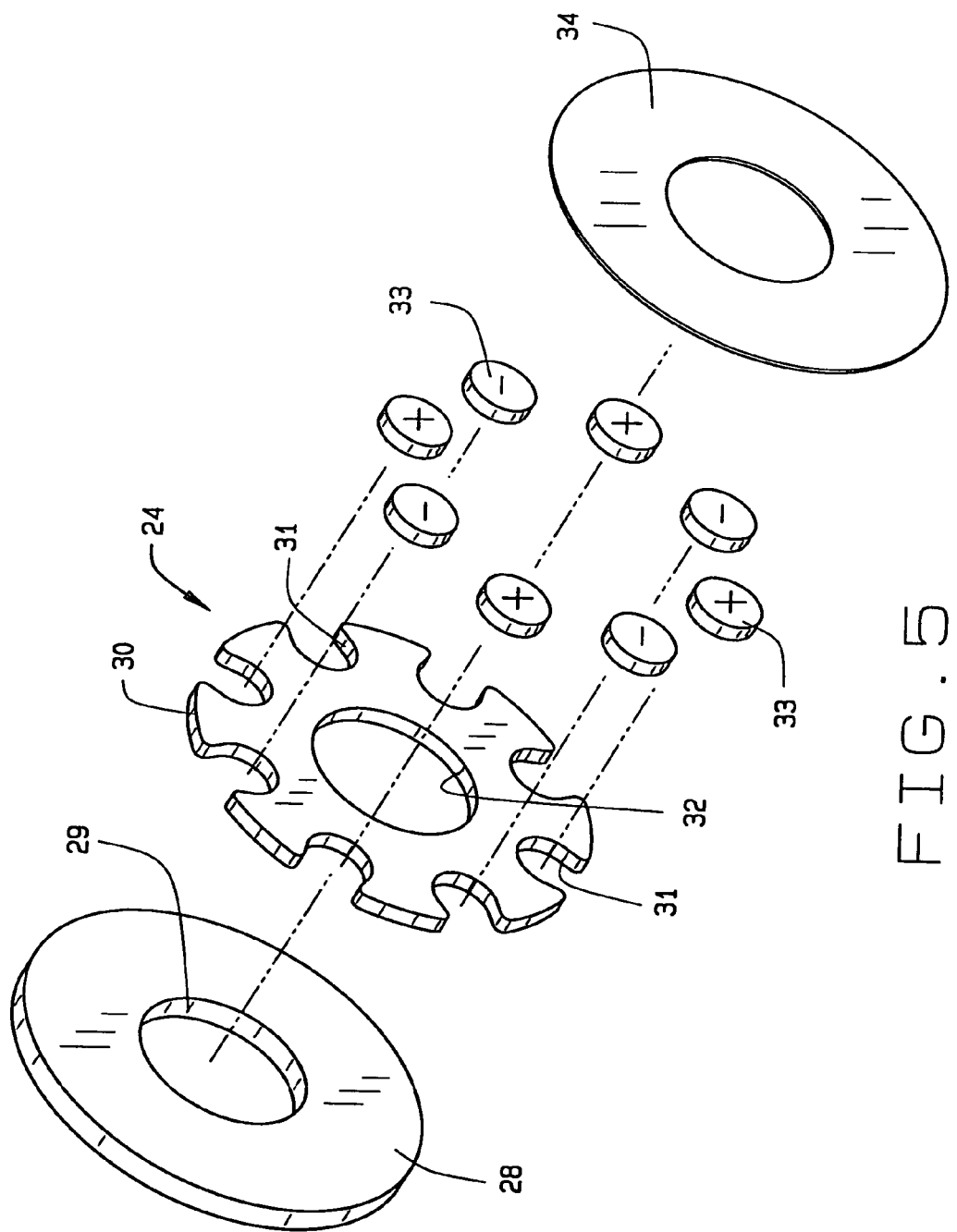
FIG. 5 shows an isometric exploded view of the continuous magnetic annulus, showing its base annulus, the spacer, the standard array of magnets, and the cover ring that disseminates the magnetic forces and flux generated from the assembled component.

The more specific structure of the continuous magnetic annulus 24 can be seen in FIG. 5. It includes an annular base 28 which has an opening 29 provided therethrough, functioning in the same manner as the opening 27, as previously referred to. The annulus 28 is of metal, it can be subject to magnetic flux, but it is not magnetic, in and of itself. Then, a spacer 30, including a series of flutes 31 formed around its perimeter, and the spacer rests against the surface of the base 28, when assembled. Its opening 32 corresponds and is of the same diameter as the opening 29, for the base 28. The spacer 30 is of an insulated material, such as rubber, or polymer, is nonmagnetic, and is provided for maintaining the various magnets 33 equally spaced apart, in their assembly within the magnetic annulus, as it is formed. Each magnet fits within one of the flutes 31, as can be noted. Then, during its assembly, a thin line metal plate 34 is applied onto the magnets, and is secured therewith by means of the magnets 33, with the magnets being attracted and held tightly against the base 28, and likewise holding the thin line metal plate 34 into an assembled position, generally as shown in FIG. 3, for the magnetic annulus 24 as noted. The thin line metal plate 34 is fabricated of a magnetic susceptible metal, such as steal, and will have a dimension of approximately 0.015 in. to 0.050 in. thickness, and provides for a uniformed dissemination of the magnetic attraction from the magnets 33, for the magnetic annulus 24, as it is assembled and readied for usage within the breakaway coupling, by locating within its second sleeve 6.

The benefit of assembling the second sleeve 6 in the manner as defined in FIG. 3 is that the magnetic annulus 24 is rather self connective. The standard round magnets 33 are of significant strength, at least able to hold the breakaway coupling together and require at least a force of 100 pounds to effect its disconnection. In addition, because the magnets are equally spaced and held by its spacer 30, the magnets are originally held by the base 28, and likewise hold the cover ring or thin plate 34 under sufficient force, together, so its assembly can be maintained simply through the use of spaced magnets, whose flux is disseminated entirely around the plate 34, to function as a further connector for holding the breakaway coupler together, during its routine usage. Also, the magnets are alternately positive and negative, as shown, to work effectively to hold the connector in place.

FIG. 4 shows the sleeve of lesser width, as noted, as is provided simply to furnish a covering for the metal annulus 40, which fits therein. The first shallow sleeve 5 that is provided for connection into the coupler includes a sleeve of lesser length, as generally noted at 35, simply to hold the annulus therein and it includes an o-ring 36 provided around its perimeter, as can be noted, so that when the first sleeve 5 locates within the second sleeve 6, there is provided an additional dust seal. Another hose connector 4 is provided, and includes that portion that remains exteriorly of the sleeve 5, during its assembly. That portion is multisided, as noted at 37, and provided for accommodating a wrench, as when that hose connector is secured onto the other end of the fluid dispensing hose, during installation of the coupler within the dispensing hose. It can be seen that the hose connector 4, as with the hose connector 3, includes a channel 38 therethrough, and includes a series of threads 39 that accommodate the threaded engagement of the hose connector onto corresponding threads of a fitting provided at the end of the hose, to be accommodated by their respective connectors 3 and 4. An o-ring 60 is provided within the connector 4 to provide a fluidic seal.

Provided for fitting within the sleeve 5 is the said metal annulus 40, which locates within the shallow cavity of the said sleeve, and it is secured therein by means of a spring E-clip 41a in a manner similar to the connection of the components when the second sleeve 6 is assembled. The hose connector 4 includes an extension 41, which has a groove around its outer edge, as at 42, and when the integral extension 41 locates through the opening 43 of the sleeve 5, and through the opening 44 of the metal annulus 40, its groove 42 can accommodate the tight locating of the said spring E-clip 41a, therein, to secure these components together. The surface, approximately at 45, of the hose connector 4, has an o-ring provided therein, that seals against the surface 46 to provide for a dust seal thereat, when the coupler is assembled. In addition, as can be noted, there is a counterbore 47 provided within the surface of the cover 48 of the sleeve 5, which is shaped to mate with the multisided configuration of the hose connector 4, to assure that there is a tight fit and seal between all of these components for the second sleeve 5, when they are assembled.

A similar type of counterbore is provided on the exterior surface of the cover 9, for accommodating the fit of the multisided surface 11, of the hose connector 3, within the back end of the second sleeve 6, to also provide that sealing engagement, through the use of the o-ring 14, biasing against the back of the cover 9, when that particular sleeve is assembled.

In addition, there is a check valve 48 locating within the sleeve 4, and a spring 49 seats upon the valve stem 50 to provide a continuous bias upon the check valve 48, when it mounts within its spider connector 51 that locates within the channel 39, of the first sleeve 4. Thus, when the breakaway coupling is separated, the valve 48 mounts upon a valve surface within the first sleeve 4, as does the valve 16, mounted within the valve surface within its hose connector 3, they provide for a sealing at both ends of the fuel dispensing hose, when separation occurs, and to prevent the untimely leakage or discharge of any fuel, when disconnection occurs.

Likewise, when the breakaway coupling is assembled, and connected, when located within a fuel dispensing hose, the valve 16 is biased rearwardly from its valve seat within the hose connector 3, and this occurs because the extension 22 of the valve 16, locates within the socket 52a of the valve 48, which causes each valve to separate from its respective valve seat, within their respective hose connectors 3 and 4, to provide for a fluid flow path through the breakaway coupling, as it is assembled and installed for usage, so that when fuel dispensing occurs, as from the nozzle into the vehicle fuel tank, there is no obstruction to the routine flow of fuel therethrough, during dispensing. But, should the nozzle be inadvertently left within the fill pipe of the vehicle, and the vehicle drives off, or if any other force is encountered by the fuel dispensing hose, when that force exceeds approximately 100 pounds of pressure, the breakaway coupling disconnects, their valves become seated within their respective hose connectors 3 and 4, and prevent the untimely discharge of any fuel from the respective ends of the dispensing hose, as can be understood.

As can be noted in FIG. 4, the pie shaped counterbores 52 provided on the backside of the cover of the first sleeve 5 is simply to provide a reduction in weight, for the entire unit, to lessen its overall weight.

As can also be noted in FIG. 4, the interior of the metal annulus 40 includes an integral shoulder 53, that seats within a corresponding counterbore in the interior of the sleeve 5, to provide for proper mating of all of these components together, when they are fastened in place, by means of the securement of the spring E-clip 41a, onto the end 42 of the hose connector 4 when assembled.

It is to be noted that each of the spring E-clips 25 and 41a have a clearance space provided at an end, such as at 54 for the clip 41a, and 55 for the clip 25, so that when it is desired to take apart the components of each of the first and second sleeves 5 and 6, a screwdriver may be located within the clearance slot, and pried radially outwardly, to allow for the clip to be disconnected, from its mounting upon their respective hose connectors 3 and 4, to achieve a separation of all of the assembled components. Also, when it is desired to manually separate the hose coupling, for inspection, or servicing, there is provided a continuous groove 56 furnished around the outer surface of the hose connector 4, so that a pair of screwdrivers may be arranged diametrically to either side of the connector 4, and pried against the outer edge 57 of the second sleeve 6, and each screwdriver being forced upwardly, to provide a bias to force a disconnection of the two sleeves, when it is desired to manually separate the breakaway coupling. This may be done for purposes to allow for servicing of the coupling, in the event that any leakage or improper operations of the breakaway coupling, has been detected.

Figure 6:
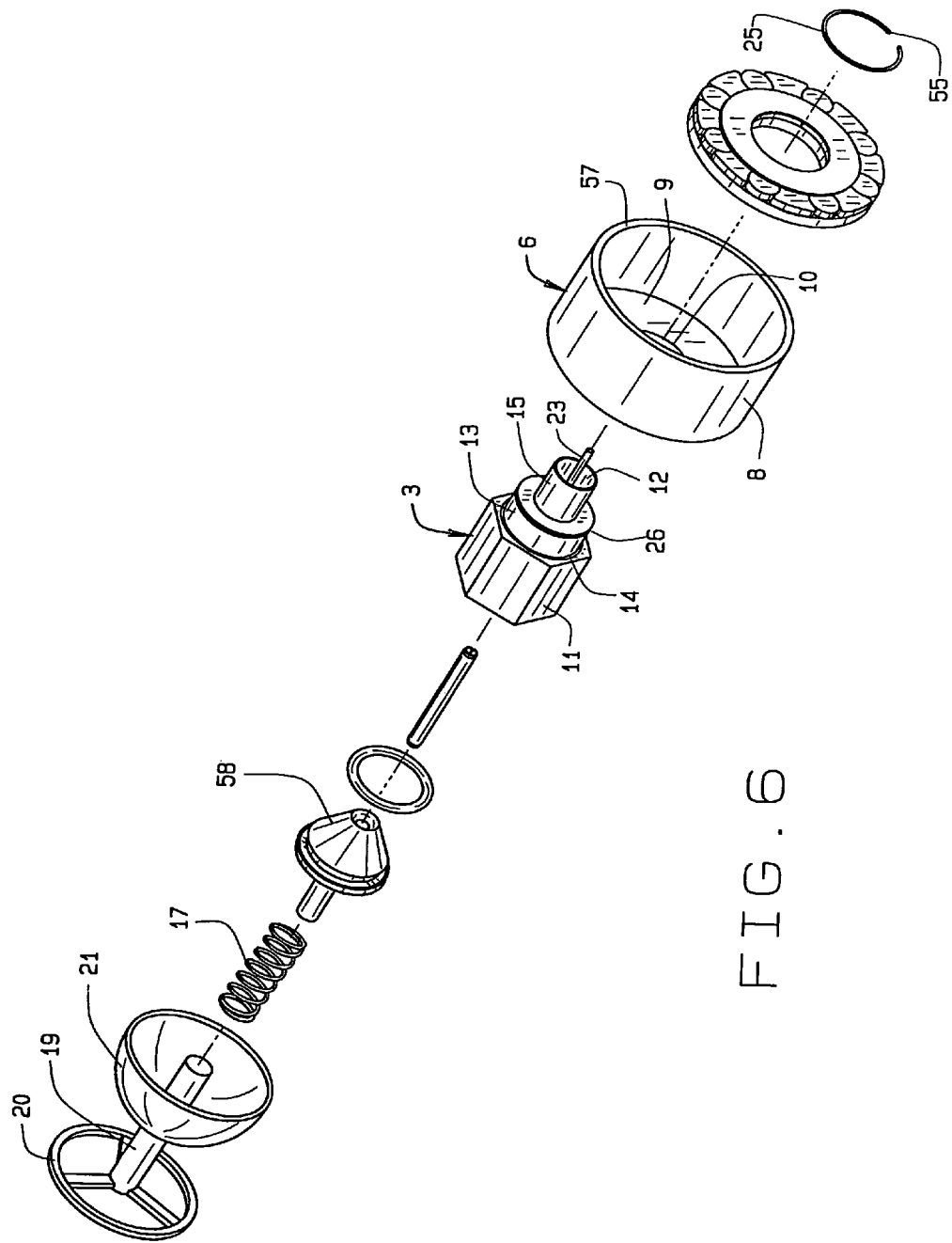
FIG. 6 shows an isometric exploded view of the second sleeve of this invention, with its continuous magnetic annulus shown apart from its sleeve, and disclosing a slightly modified check valve for the assembly.

FIG. 6 shows a further isometric exploded view of the lengthy second sleeve of the invention, with its continuous magnetic annulus shown apart from its sleeve location. In addition, its check valve 58 is disclosed, having a conical shape, so as to properly seat upon a valve seat (not shown) provided within the hose connector 3, when separation may occur for the breakaway connector.

Figure 7:
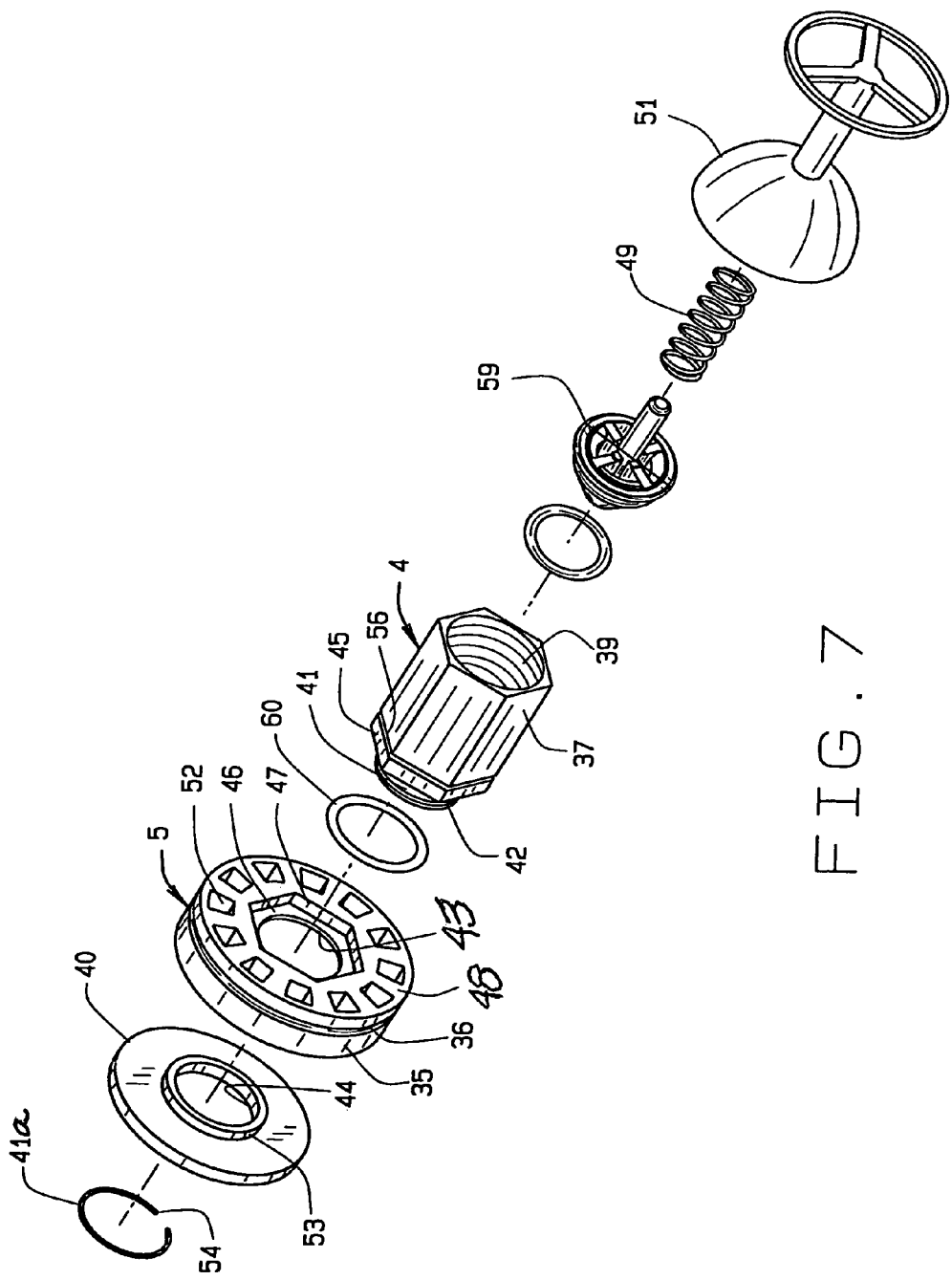
FIG. 7 provides an isometric exploded view of the shallow first sleeve of this invention, that holds the metal annulus for the breakaway connector, and further showing a slightly modified check valve for the assembly.

In addition, FIG. 7 shows an isometric exploded view of the shallow first sleeve, of this invention, and which holds the metal annulus in place for the breakaway connector. In addition, its check valve 59 is shown having a conical shape so that it can properly seat upon its valve seat (not shown) contained within the hose connector 4, as when separation occurs for the breakaway connector.

Figure 8:
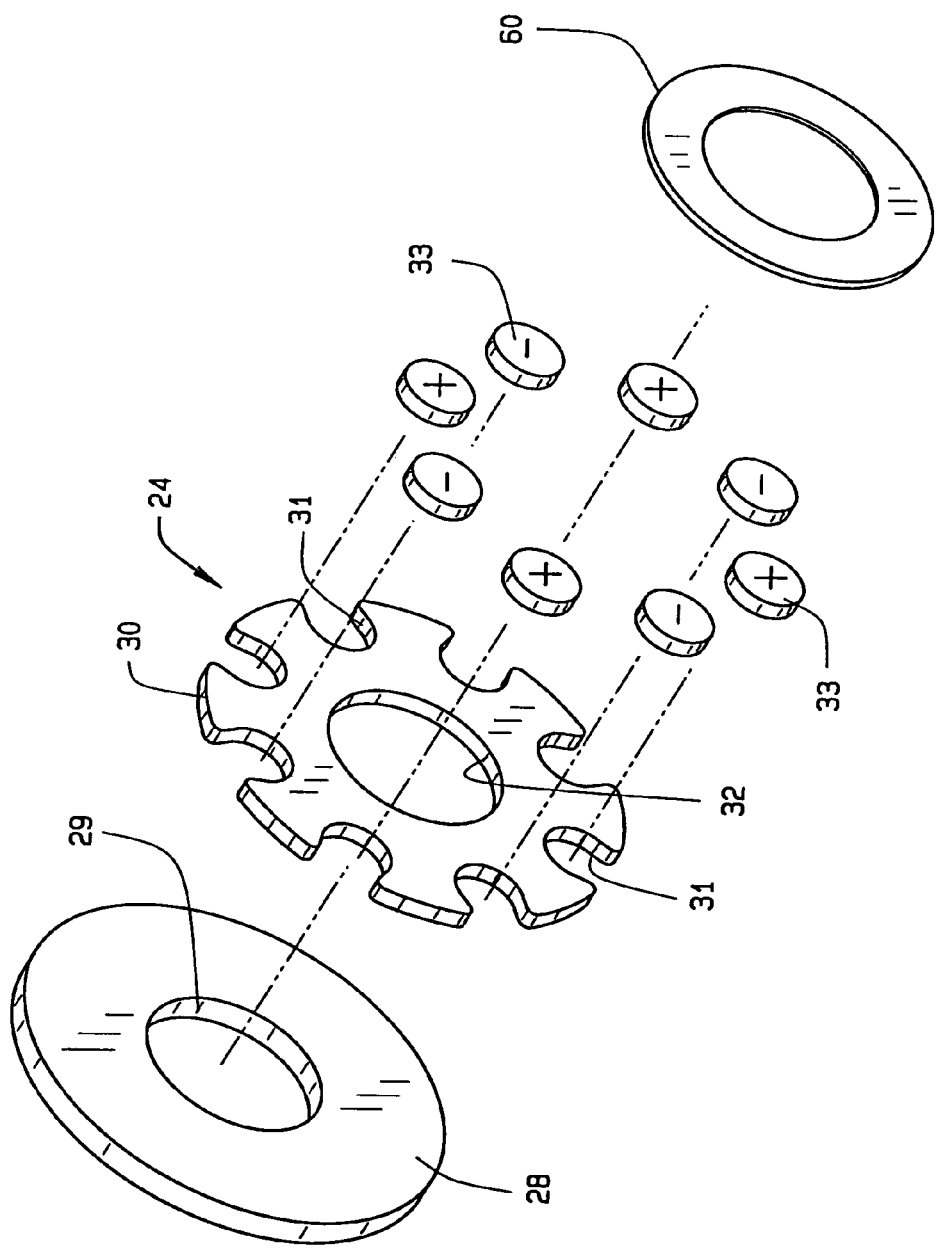
FIG. 8 shows an isometric exploded view of the continuous magnetic annulus, showing its spacer, the array of magnets, and the covering that disseminates the magnetic forces for the assembled components.

FIG. 8 discloses an isometric exploded view of the continuous magnetic annulus, similar to that as shown and described in FIG. 5, but that its flux disseminating plate 60 is of somewhat lesser diameter than the previously reviewed plate 34.

Figure 9:
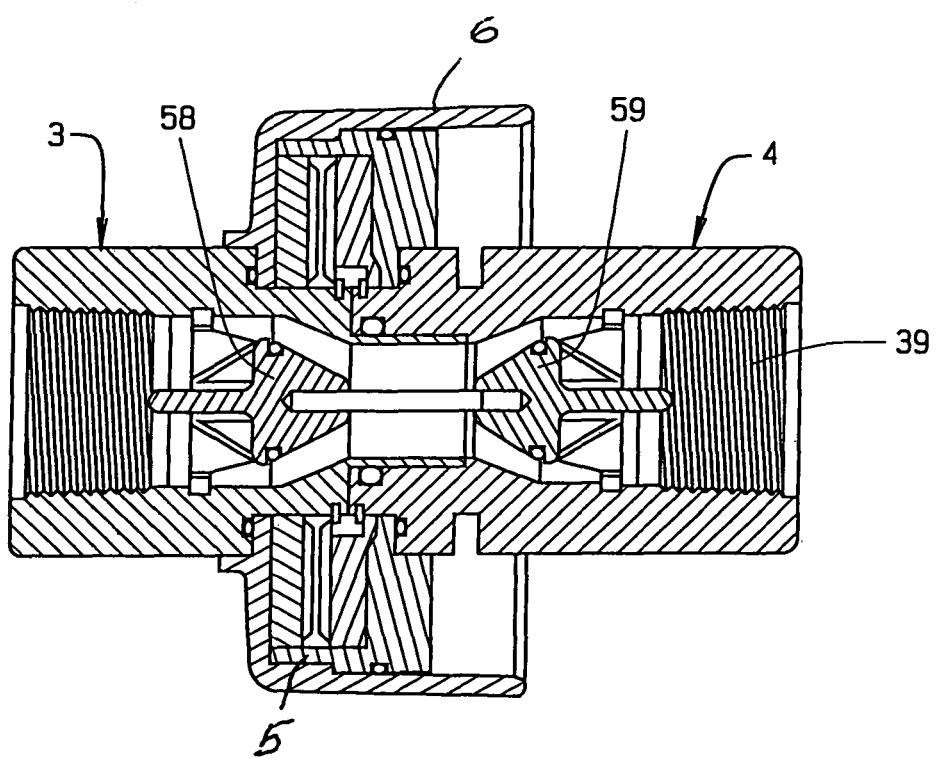
FIG. 9 provides a longitudinal sectional view of the assembled breakaway connector as shown in FIGS. 6 and 7.

FIG. 9 shows a longitudinal cross section for the type of breakaway connector as shown in FIGS. 6, 7, and 8, when they are assembled. The various components can be noted.

Variations or modifications to the subject matter of this invention may occur to those skilled in the art upon review of the structure of this breakaway coupling as defined herein. Such variations, if within the spirit of this invention, are intended to be encompassed within the scope of any claims to patent protection issuing hereon. Such variations, if within the spirit of this invention, are intended to be protected by any patent protection provided within the issued patent. The disclosure of the invention in the specification, its description in the preferred embodiment, and its depiction in the drawings, are primarily set forth for illustrative purposes only.

We claim:

1. A breakaway coupling for use in fuel dispensing that incorporates a fuel line hose and capable of separation under an excessive force exerted upon the fuel line hose in which the coupling is installed;
    said coupling including a first sleeve, said first sleeve having an opening therein and into which a hose connector partially inserts, a metal annulus provided in said first sleeve, said annulus capable of being connected with a part of the hose connector partially inserting therein;
    said coupling including a second sleeve, said second sleeve having an opening therein and into which another hose connector partially inserts, a magnetic continuous annulus provided in said second sleeve, said magnetic continuous annulus capable of being connected with a part of the another hose connector that partially inserts therein;
    said magnetic continuous annulus including a metal annular base, a series of round magnets strategically arranged in an annular array around said base, a spacer provided between the round magnets and maintaining and locating the magnets in an equally spaced relationship, and a cover ring annulus arranged over the round magnets and said spacer and furnishing a magnetized annular surface for the said magnetic continuous annulus, said magnetic annulus holding said second sleeve capable of fitting over the metal annulus holding said first sleeve when the breakaway coupling is installed for usage.

2. The breakaway coupling of claim 1 wherein each hose connector includes a check valve, when said first sleeve and said second sleeve are coupled together said check valves are unseated from valve seats and allow fuel to pass therethrough during dispensing, and when said coupling is disconnected, said check valves are seated upon the valve seats and prevent the flow of fuel therefrom.

3. The breakaway coupling of claim 2 wherein each of said hose connectors partially inserts into respective said first and said second sleeves, and a fastener securing the hose connector to said metal annulus within the first said sleeve, and another fastener securing said other hose connector to said magnetic continuous annulus within the said second sleeve.

4. The breakaway coupling of claim 2 and wherein said series of round magnets are equally spaced apart in said annular array magnetically held to said annular base, and said cover ring arranged over said magnets, said cover ring having a thickness of approximately 0.010 to 0.050 inches when applied upon said magnets.

5. The breakaway coupling of claim 2 wherein said first and said second sleeves each having an integral cover, each of said integral cover having an opening centrally provided therethrough, and said hose connectors partially inserting through said respective sleeve cover openings.

6. The breakaway coupling of claim 5 wherein each of said sleeve cover has a counterbore therein, and said associated hose connector provided for seating within the respective cover counterbore when secured.

7. The breakaway coupling of claim 6 wherein the part of each of said hose connector remaining exteriorly of the sleeve cover being of multisided shape, and the sleeve cover counterbore having a corresponding multisided shape to accommodate mating of the hose connector therein.

8. The breakaway coupling of claim 7 wherein each of said hose connector being of hexagonal shape to accommodate a mounting of a tool thereon.

9. The breakaway coupling of claim 2 wherein one of said check valves has an extended pin, and the other of said check valves provides a socket, wherein when said first and said second sleeves and the associated hose connectors are magnetically coupled together, the check valves unseat from the respective valve seats to allow fuel to flow unobstructed therethrough and to be dispensed.

10. The breakaway coupling of claim 1 wherein said first sleeve has a length substantially lesser than a length of the second sleeve.

11. The breakaway coupling of claim 10 wherein said first sleeve fits within said second sleeve when the coupling is prepared for installation and usage.

12. The breakaway coupling of claim 1 wherein each of said hose connectors on the part that is exteriorly of the respective sleeve has an internal channel provided therethrough, and said channel being threaded to provide for connection to the proximate fuel line hose when prepared for usage.

13. The breakaway coupling of claim 1 wherein said metal annulus has an annulus shoulder provided around a central aperture, and said sleeve cover having internally a corresponding seat formed therein to accommodate a location of the annulus shoulder therein during assembly.

14. The breakaway coupling of claim 6 wherein each said hose connector locating within the respective sleeve counterbore having an o-ring provided thereat to form a seal, prevent leakage of the dispensed fuel during usage, and to act as a dust guard.

15. The breakaway coupling of claim 1 wherein a force required for separating the magnetic breakaway coupling is approximately 100 to 300 pounds of said force.

16. A breakaway coupling for use in fuel dispensing that incorporates a fuel line hose and capable of separation under an excessive force exerted upon the fuel line hose in which the coupling is installed, said coupling including a first sleeve, said first sleeve having an opening therein and into which a hose connector partially inserts, a metal annulus provided in said first sleeve, said annulus capable of being connected with a part of the hose connector partially inserting therein;

said coupling including a second sleeve, said second sleeve having an opening therein and into which another hose connector partially inserts, a magnetic annulus provided in said second sleeve, said magnetic annulus capable of being connected with a part of the other hose connector that partially inserts within said second sleeve;

said magnetic annulus including an annular base, a series of magnets incontiguously arranged in an annular array upon said base, a spacer provided between said arranged magnets and supporting a location of the magnets within said second sleeve, and a cover ring annulus arranged over the magnets and said spacer to furnish a magnetized annular surface; and said second sleeve with said magnetized annulus capable of fitting within and engaging the metal annulus within the first sleeve, when the breakaway coupling is installed for fuel dispensing.

17. The breakaway coupling of claim 16 wherein said first sleeve is substantially shorter in length than a length of said second sleeve.

18. The breakaway coupling of claim 17 wherein the length of the first sleeve is approximately equal to a width of the metal annulus.

* * * * *